United States Patent [19]
Chivers

[11] Patent Number: 5,626,659
[45] Date of Patent: May 6, 1997

[54] MEANS AND METHOD OF RECYCLING ASPHALT COMPOSITION SHINGLES

[76] Inventor: Morgan A. Chivers, 38544 Jones Way, Fremont, Calif. 94536

[21] Appl. No.: 605,327

[22] Filed: Feb. 14, 1996

[51] Int. Cl.$^6$ ............................ C09D 195/00; C08L 95/00
[52] U.S. Cl. ............................ 106/284.04; 106/284.01; 106/282; 106/401
[58] Field of Search ................ 106/284.01, 284.04, 106/282, 401

[56] References Cited

U.S. PATENT DOCUMENTS 5,201,472  4/1993  Brock .................................... 241/22

Primary Examiner—David Brunsman
Attorney, Agent, or Firm—James P. Hillman

[57] ABSTRACT

The present invention is directed to means and method for grinding waste asphalt shingles in combination with limestone ore to provide a very fine particulate substance that is suitable as an admix to raw materials used for asphalt shingle production. When grinding the asphalt shingles/limestone ore combination, it was found that the limestone scrubs the asphalt, including temperature softened asphalt, from the grinding mechanism and therefore prevents clogging of the asphalt/limestone ore grinding equipment. According to the teachings of the invention, the limestone and asphalt shingle constituents can be ground into fine homogeneous particulate powder that is free of agglomeration. A desired size reduction was achieved. Ninety-eight percent of the homogenous particulate powder passed through a thirty-five mesh screen. Ratios of limestone to waste asphalt shingles ranging from 100:10, 100:20, 100:30 and 100:40 were processed through the grinding machinery without any clogging or without causing any build-up of asphalt residue on the grinding mechanism.

16 Claims, 2 Drawing Sheets

MEANS AND METHOD OF RECYCLING ASPHALT COMPOSITION SHINGLES

BACKGROUND OF THE INVENTION

1. Field of the Invention

The invention relates in general to asphalt composition shingles and in particular to a means and method for recycling waste asphalt shingles back for re-use as a raw material for the shingle production process by grinding shredded shingles in combination with limestone ore.

2. Description of the Related Art

For some time now, asphalt roofing manufacturers have been struggling with the problem of disposal of waste asphalt shingles product. With landfill regulations becoming more stringent, recycling defective/blemished new shingles and even local "tear-off" (used) shingles back into the production process would have the distinct advantages of eliminating escalating disposal cost and reducing the requirement for fresh raw materials.

U.S. Pat. No. 4,706,893 issued to James Brock discloses a method and apparatus for recycling roofing shingles as an additive to asphalt paving composition for roadway use. The shingles are comminuted to a particle size which are then added to liquid asphalt and thoroughly mixed to produce an asphalt paving composition. U.S. Pat. No. 5,201,472 issued again to James Brock discloses a method of preparing and storing recyclable roofing shingles for asphalt paving composition. The patentee discloses that the comminuted shingle particles of his earlier patent tended to stick together. He solves this problem by mixing the asphalt roofing shingles with a carrier aggregate to prevent the shredded asphalt roofing pieces from sticking together.

Currently, there is no known process whereby waste asphalt composition shingles have been successfully recycled as a raw material for new shingle production. New shingle production requires a smooth application and absorption of a homogeneous asphalt material to a fiberglass mat as opposed to a batch mixing of bulk ingredient materials such as Brock employs in his production of paving asphalt. Some of the methods that have been contemplated and/or attempted include the following:

1. a method of using highly reactive cutting solvents to dissolve and extract the asphalt from the waste shingle. The solvents would then be extracted from the asphalt by evaporation or distillation. The problems inherent in this process are that the solvents pose very dangerous health and environmental conditions.
2. a method of running the shingles through a series of high pressure rolls, similar to calender rolls in a paper mill, thereby causing compression to the shingle. Theoretically, there would be heat generated during compression and the shingles would be crushed into a pasty mass which then could be scraped from the rolls with doctor blades and then somehow be added back to the manufacturing process.
3. a method of grinding the shingle while submerged under a suitable liquid. The resulting product would be a granule sized aggregate that would be used as head-lap granules on the surface of the shingle (head-lap is the term given to the unexposed surface of the shingle).

None of the above processes ever obtained practical application. U.S. Pat. No. 5,385,426 discloses milling roofing shingle pieces to particles and granules and impinging the particles and granules with intermittent blasts of compressed air and pressurized water to prevent clogging and sticking inside a hammer mill and to assist in discharging the reduced shingle material. This patent again shows the inherent sticking problems associated with this art and the lengths those skilled in the art will undertake to solve or just cope with the problem. Physical characteristics of asphalt present very difficult obstacles when attempting to separate its composition constituents and/or reduce its size through dissolving, milling, crushing or grinding. Asphalt has a relatively low softening point of approximately 200° Fahrenheit. At higher temperatures it becomes viscous to the point of liquid, and at lower temperatures it becomes gummy to solid. Consequently, there is a tendency for asphalt shingles to gum up and stick to equipment that is employed for reprocessing tasks, such as those enumerated above. Additionally, the product resulting from such processes tends to become one agglomerated mass which cannot be easily handled. Accordingly, it would be desirable to have a means and method by which asphalt composition shingles could be ground to a very fine particulate suitable for an admix to the raw materials used for asphalt shingle production. Further, it would be even more desirable if that asphalt particulate did not agglomerate in the grinding process, but rather formed an easily handled powder that could be stored and uniformly controlled when recycled back to the manufacturing process.

SUMMARY OF THE INVENTION

Briefly, the present invention is directed to means and method for producing a storable recyclable asphaltic material from waste asphalt shingles for use as an additive to the standard manufacturing process for making asphalt shingles. The teachings of the invention include grinding waste asphalt shingles in combination with an aggregate means such as for instance limestone ore (or other ore of similar hardness, grinding, handling, etc. characteristics) to provide a very fine particulate substance that is suitable as an admix to raw materials used for asphalt shingle production. When grinding the asphalt shingles/limestone ore in combination it was found that the limestone scrubs the asphalt, including temperature softened asphalt, from the grinding mechanism and therefore prevents clogging and sticking of the asphalt/limestone ore grinding equipment. According to the teachings of the invention, the limestone and asphalt shingle constituents can be ground into a fine homogeneous particulate powder that is free from agglomeration and is fine enough to meet even the most stringent requirements of asphalt composition shingle manufacturing processing.

Although the invention is not to be so limited, by way of example, a desired size reduction was achieved with a particulate size range of 5–30 microns and an average size of 10–15 microns. Ninety-eight percent of the homogeneous particulate powder passed through a thirty-five mesh screen. Thus, 98% of the resulting limestone/asphalt shingle homogeneous particulate powder was successfully ground fine enough to admix and remain in suspension in a liquid-filled asphalt coating tank which will be described infra with reference to block 16 of FIG. 1.

Limestone ore (or other ore of similar nature) sized from 0–¾ inches (from dust or fine powder to solids that will pass through a ¾ inch mesh screen) was combined with waste asphalt shingles in ratios ranging from 100:10, 100:20, 100:30 and 100:40 and then processed through the grinding machinery without any clogging or without causing any build-up of asphalt residue on the grinding mechanism. The 100:40 ratio was successfully passed through both hammer mill and disk grinder types of grinding machinery without any clogging or without causing any build-up of asphalt residue on the grinding mechanism. Not until the ratio was increased to 100:56, was some gumming-up of the disk grinder mill noticed.

BRIEF DESCRIPTION OF THE DRAWINGS

The invention may be understood, and further advantages and uses are more readily apparent, when considered in view of the following detailed description of the exemplary embodiments, taken with the accompanying drawings, in which.

DESCRIPTION OF THE PREFERRED EMBODIMENTS

The invention comprises means and methods to process waste asphalt composition shingle products by grinding to provide a finely ground homogeneous powder that is free of agglomeration. This homogeneous powder produced from the waste asphalt shingles can then be recycled back as a raw material for new shingle manufacturing production. Typically, asphalt composition shingles include the following raw material constituents:

1) Finely ground limestone filler ranging from 55–70% by weight;

2) Asphalt coating 20–24% by weight;

3) Face granules, fiberglass mat and sand back-surfacer comprise the remainder, approximately 18% by weight.

Figure 1:
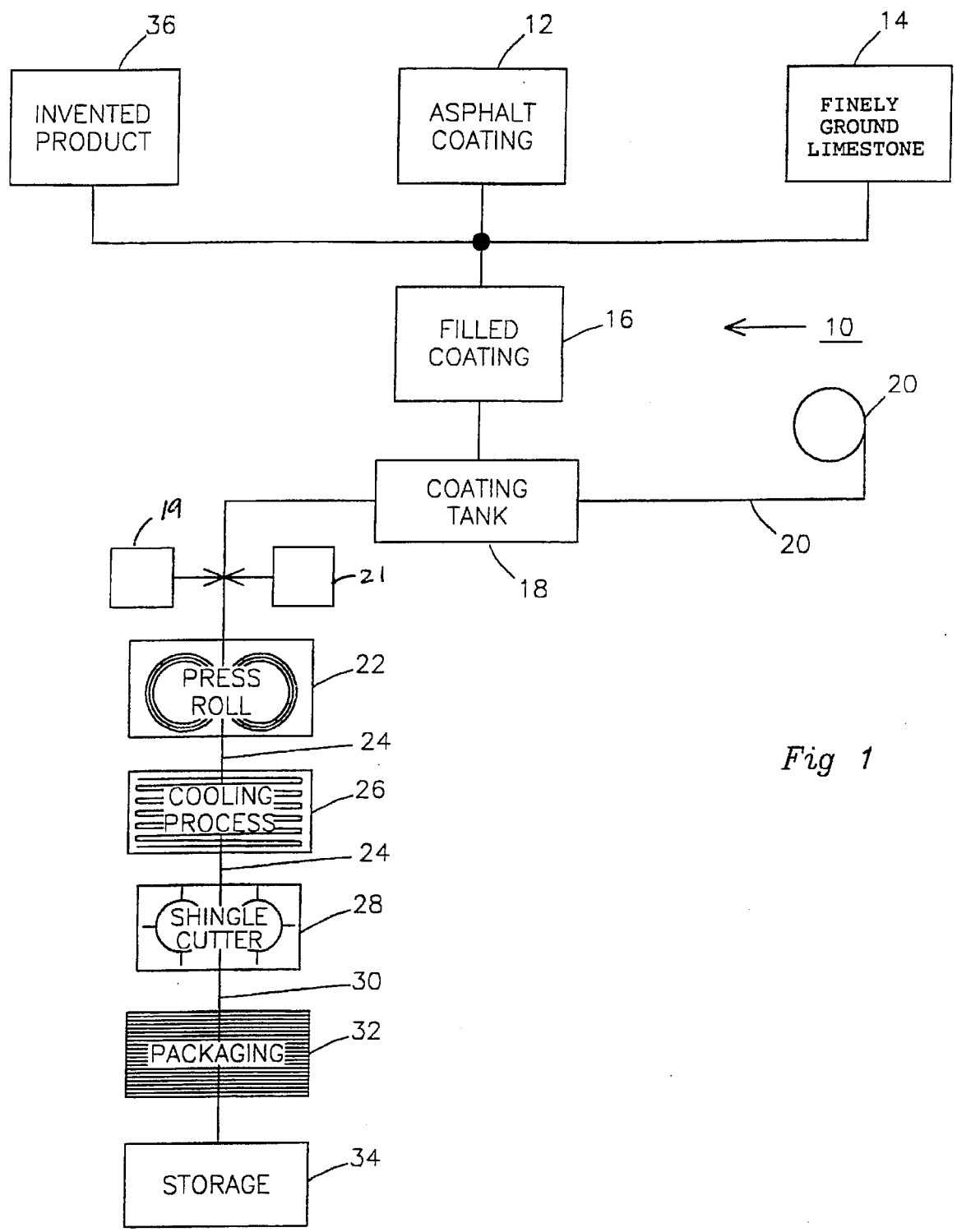
FIG. 1 is a combination schematic and block diagram showing the waste shingle recycling process method according to the teachings of the invention.

Referring now to the drawings, there are combination schematic and block diagrams showing the waste shingle recycling process steps according to the teachings of the invention. Referring to FIG. 1 in particular, there is illustrated a combination schematic/block diagram 10 for the processing of raw materials to manufacture, package and inventory asphalt shingles. Block 12 represents heating of the asphalt coating material to a temperature of approximately 460°–480° F. Finely ground limestone filler represented at block 14 is added to the hot liquid asphalt coating and mixed into a homogeneous mixture at block 16. The product of the combined asphalt coating and finely ground limestone at block 16 is commonly referred to as filled coating. The filled coating mixture is heated during this process to maintain a 460°–480° F. temperature.

The filled coating at 16 is next pumped to a coating tank at block 18 wherein metering rolls (not shown) control its application to a continuous length fiberglass mat 20 as the fiberglass mat 20 is drawn through the coating tank 18. Granules are then applied to the top side of the continuous length of coated fiberglass mat at 19 and sand back surfacer is applied to the back side at 21. A press roll then imbeds the granules and back surfacer sand into the top and back sides respectively of the continuous length of coated fiberglass mat at block 22. The continuous sheet of newly manufactured asphalt composition shown at 24 is then run through or subjected to a cooling process at block 26 after which continuous sheet 24 is then cut into dimensional lengths by a suitable cutter at block 28. The finished shingles represented at 30 are then packaged at block 32 and shipped to storage or the marketplace at block 34.

For many years now, asphalt composition roofing manufacturers have searched for a method to recycle waste asphalt shingles for re-use as a raw material in the manufacturing process. This objective is primarily driven by increased restrictions and consequential escalating costs to dispose the waste product at landfills. In addition, if the waste product asphalt composition shingles could be successfully recycled, it would lessen the requirement for fresh raw materials. All of these benefits would result from a suitable means of recycling waste product asphalt composition shingles. However, as mentioned supra, except for bulk recycling in road pavement asphalt such as described in Brock U.S. Pat. Nos. 4,706,893 and 5,201,472, recycling waste product asphalt composition shingles has inherent problems in milling the shredded pieces to suitable particle size as detailed in Omann U.S. Pat. No. 5,385,426.

The invention thus includes means and methods for grinding a combination of asphalt composition shingles and limestone ore to a fine particulate substance and the product of such grinding means and methods is suitable as an admix to filled coating. Accordingly, the purchased finely ground limestone filler shown at block 14 could be partially or completely eliminated by the shingle recycling process shown at invented product block 36 in FIG. 1. Additionally, the fresh asphalt coating represented at block 12 could be reduced by and proportionally to the amount of asphalt constituent contained in the waste shingle product.

The product of this finely ground waste asphalt shingle/limestone composition is thus a suitable admix to the filled coating. The reclaimed asphalt reduces the requirement for fresh asphalt. The added limestone ore and the limestone and finely ground granules already contained within the shingles, reduces the requirement for limestone filler. The other waste shingle constituent is fiberglass mat which is also reduced within the constituent powder and will disperse and remain suspended within when added to the filled coating. It is noteworthy to mention that the waste shingle/limestone composition will be sufficiently ground and reduced in size such that it will remain substantially in suspension when mixed with the filled coating.

Figure 2:
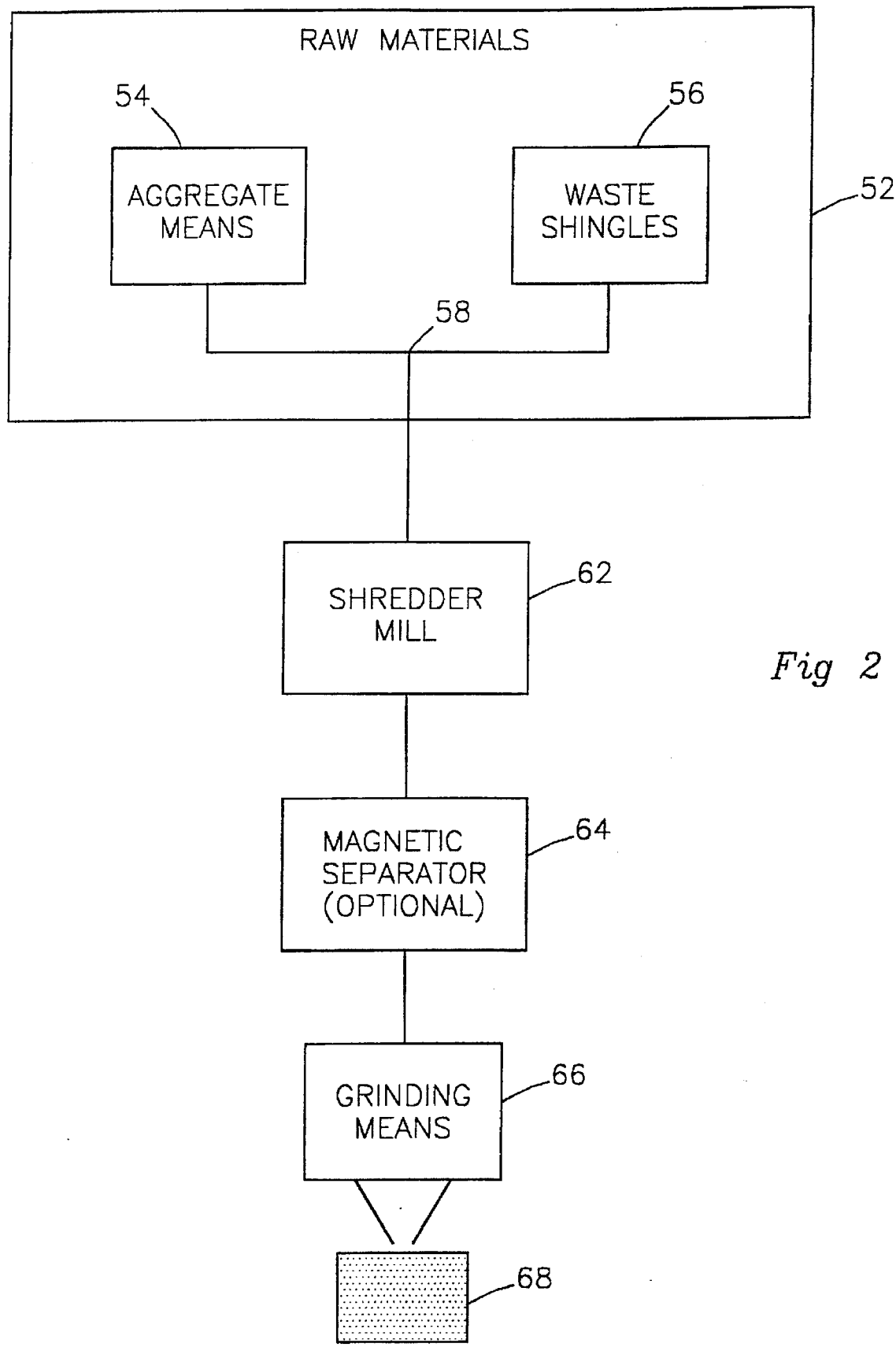
FIG. 2 is a block diagram showing a further breakdown of the Filler Block of FIG. 1 into its component steps.

Referring now to FIG. 2, there is shown a block diagram of the shingle recycling process of the invention represented at invented product block 36 of FIG. 1. The shingle recycling process of the invention block diagram includes raw material block 52 including raw aggregate sub block 54 which holds raw aggregate such as (but not limited to) limestone ore ranging in size from 0" to 4" and waste shingles sub block 56 where previously whole waste shingles are hoppered or staged for processing. Limestone ore 54 is combined with waste shingles 56 at junction 58 and fed into a shredder mill represented at block 62 where the combined limestone ore and waste shingles are shredded and intermingled. Leaving block 62, the shredded shingle and limestone ore mixture ranges in size from 0–¾" (fine powder through ¾ inch screened ore size). The fully combined limestone ore/waste shingles product is next fed into optional magnetic separator at block 64 where roofing nails or other metals are removed from the product. The limestone ore/waste shingles product is next fed into a grinding means which may for example be a hammer mill at block 66 to become a finely ground homogeneous powder 68 that is free of agglomeration. Alternate grinding means employed may be a disk grinder, ball mill, burr mill, or any other suitable impact mill or abrasive mill, among others. The temperature in the hammer mill (shown at block 66) may and often does exceed 200° F., well above the softening point of asphalt. As the limestone ore intermingles with the shredded waste shingles, it prevents clogging and sticking of the hammer mill by constantly abrading the asphalt particles off the grinding mechanism. The limestone or other aggregate (such as dolomite or others) then scrubs the grinding equipment while it adheres to and intermingles with the asphalt particles to provide a fine homogeneous powder suitable for use as a raw material for asphalt shingle production. A preferred size reduction of 98% passing through a 35 mesh screen was achieved. A preferred particulate size range of the finely ground homogeneous powder is 5–30 microns with size of 10–15 microns. Ratios of limestone to waste shingles were processed at 100:10, 100:20, 100:30, and 100:40 without any problems of clogging or causing build-up on the grinding mechanism. The 100:40 ratio was successfully passed through both hammer mill and disk grinder types of grinding machinery without any clogging or without causing any build-up of asphalt residue on the grinding mechanism. When the ratio was increased to 100:56, some gumming up of the disk grinder mill was noticed.

In conclusion, what has been disclosed is a novel way to recycle both new and used ("tear-off") shingles into the shingle manufacturing process. As taught by the invention, raw aggregate such as limestone ore is combined with waste asphalt shingles and is then fed into a suitable grinding means to produce a finely ground particulate powder which is suitable as an admix for the manufacturing process. The resulting powder has been heated in excess of 300° Fahrenheit without melting, thereby demonstrating that the limestone/waste shingle mixture will successfully pass through grinding machinery without sticking or gumming of the equipment.

I claim:

1. A method for grinding asphalt shingles, comprising the steps of:
   a) combining limestone ore or dolomite with the asphalt shingles; and
   b) grinding the combined asphalt shingles with limestone ore or dolomite to provide an asphalt shingle/aggregate powder suitable for making asphalt shingles.

2. The method for grinding asphalt shingles of claim 1 wherein step a) further includes the step of c) varying the ratio of limestone ore to asphalt shingle to provide a finely ground asphalt/limestone homogeneous powder.

3. The method for grinding asphalt shingles of claim 2 wherein step c) includes the step of combining the limestone ore with asphalt shingles in a ratio selected from the group consisting of 100/10, 100/20, 100/30 and 100/40.

4. The method for grinding asphalt shingles of claim 2 wherein step c) includes the step of combining the asphalt shingles with limestone ore in a ratio such that grinding step b) is accomplished without clogging the grinding equipment.

5. The method for grinding asphalt shingles of claim 2 wherein step b) includes the step of grinding the homogeneous powder to a particulate size range suitable for admixing to asphalt filled coating.

6. The method for grinding asphalt shingles of claim 5 wherein the particulate size range is free of agglomeration such that 98% of said powder will pass through a 35 mesh screen.

7. An asphalt filled coating containing the finely ground powder of claim 2.

8. A composition for making asphalt shingles containing the finely ground powder of claim 2.

9. A method for grinding asphalt shingles, comprising the steps of:
   a) combining limestone ore with asphalt shingles in a ratio of 100 to less than 56; and
   b) grinding the combined asphalt shingles with limestone ore to provide an asphalt shingle/limestone powder.

10. The method for grinding asphalt shingles of claim 9 further including the step of c) varying the ratio of limestone ore to asphalt shingle to provide a finely ground asphalt/limestone homogeneous powder.

11. The method for grinding asphalt shingles of claim 10 wherein step c) includes the step of combining the limestone ore with asphalt shingles in a ratio selected from the group consisting of 100/10, 100/20, 100/30 and 100/40.

12. The method for grinding asphalt shingles of claim 10 wherein step c) includes the step of combining the asphalt shingles with limestone ore in a ratio such that grinding step b) is accomplished without clogging the grinding equipment.

13. The method for grinding asphalt shingles of claim 10 wherein step b) includes the step of grinding the homogeneous powder to a particulate size range suitable for admixing to asphalt filled coating.

14. The method for grinding asphalt shingles of claim 13 wherein the particulate size range is free of agglomeration such that 98% of said powder will pass through a 35 mesh screen.

15. A filled coating containing the finely ground powder of claim 10.

16. A composition for making asphalt shingles containing the finely ground powder of claim 10.

* * * * *